UNITED STATES PATENT OFFICE.

MARTIN HILL ITTNER, OF JERSEY CITY, NEW JERSEY.

CATALYZER FOR HYDROGENATING OILS AND THE LIKE.

1,238,774.

Specification of Letters Patent.    Patented Sept. 4, 1917.

No Drawing.    Application filed May 14, 1914. Serial No. 838,478.

*To all whom it may concern:*

Be it known that I, MARTIN HILL ITTNER, a citizen of the United States, residing in Jersey City, Hudson county, State of New Jersey, have invented certain new and useful Improvements in Catalyzers for Hydrogenating Oils and the like; and I do hereby declare the following to be a full, clear, and exact description of the invention, such as will enable others skilled in the art to which it appertains to make and use the same.

My invention relates to certain new and useful improvements in catalyzers, for use in the hydrogenation of oily material containing unsaturated bodies as, for instance, fatty acids and their esters.

It is based upon the discovery that charcoal, which has deposited throughout its structure a small amount of certain mineral bodies, as, for example, certain compounds of the earth metals or alkaline earth metals, such as alumina, or silicates of metals like aluminum, calcium, magnesium and cerium, possesses entirely different properties from ordinary charcoal, in so far as its catalytic activity is concerned, although in other respects identical with ordinary charcoal. This superior catalytic activity of the charcoal treated in accordance with my invention is developed when it is used as the porous body upon which the catalytic material, say metallic nickel, active nickel oxid, or the like, is deposited, and is extraordinary in degree and importance. Thus, while ordinary charcoal or organic carbon even when subjected to methods of purification is possessed of no more value as a support for an active metal or active metal oxid than other inert supports, such as pumice or kieselguhr, and is even inferior to these, charcoal treated in accordance with my invention adds very greatly to the efficiency of the catalytic action, as will hereinafter more fully appear.

In the preparation of charcoal, in accordance with my invention, organic matter, as, for example, wood, (say, spruce or cedar), may be subjected to dry distillation in a retort. However, I do not limit myself to the use of any particular wood in making my active charcoal, as I have obtained good results with both coniferous and deciduous wood. I have also made active charcoal appropriate to the present invention from other organic substances, as, for instance, cornstalks and peat. The atmosphere of the retort may be kept under reduced pressure, or the distilling operation may be expedited by means of a current of superheated steam passed through the retort, or a current of carbon dioxid gas. It is best not to use too high a temperature in making the charcoal, but it should nevertheless be sufficiently high to drive off volatile matter.

After the distillation has progressed until it is substantially complete so that volatile products of decomposition are no longer given off by increased heat, the resulting charcoal is allowed to cool out of contact with the air. When entirely cool, it may then be powdered, and saturated with a dilute solution of an alkaline silicate; an 8% solution of sodium silicate may be used to advantage, although the strength of the solution may be varied considerably in either direction.

The charcoal thus impregnated with silicate should then be heated in a closed retort, to a dull red heat or a temperature somewhat under a dull red heat. It should then be allowed to cool to atmospheric temperature out of contact with air before being removed from the retort and may then be treated with a solution of say aluminum sulfate, alum, or other salt of aluminum. The support thus prepared may be washed with water, and coated or impregnated with catalytic metal, as for instance, nickel, or other catalytic substance, (as, for instance, active oxid of nickel).

Any of the well known methods for coating or impregnating a support with an active catalytic metal may be used. If the nickel is obtained by first saturating the active charcoal with a solution of nickel nitrate, and later igniting in the presence of the nitrate, I have found a dilute solution of the nitrate to give the best results. A good way to prepare the catalyzer is to saturate the active charcoal with a solution of some nickel salt, then remove the excess nickel solution by pressure or filtration, and then treat the active charcoal, coated and impregnated with nickel solution, with an excess of a dilute solution of sodium carbonate or other precipitant, whereby the nickel becomes fixed within and upon the active charcoal in a form insoluble in water. The excess sodium carbonate and other soluble salts should then be washed out with water, and the mass subjected to drying and to heat in a current of hydrogen gas whereby the nickel compounds are reduced to metallic nickel.

The catalyzer thus formed may be thrown into oil or fat without being exposed to the air, and the mixture of oil and catalyzer, or fat and catalyzer, may then be used in the hydrogenation of unsaturated oily materials.

In some instances, the metallic nickel of my catalyzer may be subjected to mild oxidation, whereby it is converted wholly or partly into a low oxid of nickel, which, while still possessing active catalytic properties is nevertheless comparatively stable when exposed to the atmosphere. This oxidation may be brought about advantageously by passing a current of carbon dioxid, at the temperature of a dull red heat or a temperature somewhat under a dull red heat, over the reduced nickel, whereby a portion of the oxygen of the carbon dioxid is yielded to the nickel to form a low oxid of nickel, which is still stable at that temperature. By keeping the catalyzer, while it is cooling, in contact with carbon dioxid gas the nickel is prevented from taking up oxygen from the air, while the carbon dioxid does not yield its oxygen to the nickel or low oxid of nickel at low temperatures to form other and inactive oxids of nickel.

I can also produce the active low oxid of nickel upon the catalyzer by allowing the catalyzer containing metallic nickel to cool, after having reduced the metal, out of contact with the air, preferably in the presence of hydrogen gas, then exhausting by means of an efficient vacuum pump, all the gas possible from the catalyzer, and then introducing gradually and slowly air at a low temperature. In this way, only a slight amount of oxidation can take place, at a given time, and without the generation of appreciable heat, and without the presence of excess oxygen; until finally, a point is reached when no further oxidation takes place.

Should the hydrogen gas adhering to the catalyzer not be removed or displaced before air is allowed to come in contact with the catalyzer, the catalytic action of the metallic nickel would cause the hydrogen to combine at once with the oxygen of the air, thus producing enough heat to cause the metallic nickel of the catalyzer to oxidize to an extent that appreciably diminishes its activity. This same over-oxidation of the catalyzer takes place to a less degree if the catalyzer freed from adhering hydrogen gas is allowed to come in contact with warm air, or if the air is admitted too rapidly.

In case my catalyzer is prepared from active charcoal made by impregnating charcoal with calcium or magnesium compounds, it is especially desirable to treat the catalyzer with carbon dioxid to avoid an excess of free lime or magnesia.

A catalyzer prepared, as described, from charcoal rendered active by the treatment characteristic of my invention is from ten to more than one hundred times as active in the hydrogenation of oils as a catalyzer which is in all other respects the same except for the manner in which the charcoal is prepared, and it is very much more active than catalyzers in other respects the same but which are made with the employment of kieselguhr, pumice, or other inert porous support in place of my active charcoal.

Accordingly, I find that where the hydrogenation of oils on a large scale is carried on, and where an amount of my improved catalyzer is employed equivalent to the amount customary when ordinary nickel catalyzers are employed, the hydrogenation, which begins at a low temperature proceeds so rapidly by the time the temperature has reached 150° C. that the heat due to rapid absorption of the hydrogen frequently makes it necessary to resort to external cooling or to a temporary suspension of the operation in order to prevent over-heating. I therefore find it advantageous to operate with a very much smaller amount of my catalyzer than is necessary where the catalytic metal is deposited upon charcoal that has not been made active by the treatment herein described, or which has been deposited upon any other porous inert material, such as kieselguhr and pumice.

The amount of metal that is necessary to produce good results in operating with my catalyzer is so small that its cost is practically negligible as a factor in the hydrogenation of the oil. So also, the active charcoal that forms a part of my catalyzer is readily made at a low cost. Furthermore, my catalyzer may be used to hydrogenate many successive lots of oil, which fact, coupled with its very low initial cost, makes it practically negligible as an item of expense per pound of oil hydrogenated.

I do not restrict myself to the employment of nickel as the coating or impregnating agent for the active charcoal, although, as indicated, it is highly serviceable and efficient. When nickel is employed, I operate preferably with a catalyzer containing from 2% to 10% of nickel. A catalyzer containing more than 10% of nickel can be used, but the efficiency per unit of nickel becomes less if 10% is materially exceeded.

What I claim is:—

1. A catalyzer, comprising a catalytic material associated with charcoal impregnated with a catalytically activating inorganic compound; substantially as described.

2. A catalyzer, comprising a catalytic metal associated with charcoal impregnated with a catalytically activating inorganic compound; substantially as described.

3. A catalyzer, comprising a catalytic metal having a surface coating of catalytic oxid, associated with charcoal impregnated with a catalytically activating inorganic compound; substantially as described.

4. A catalyzer, comprising nickel, associated with charcoal impregnated with a catalytically activating inorganic compound; substantially as described.

5. A catalyzer, comprising nickel, having a surface coating of a low oxid of nickel, associated with charcoal impregnated with a catalytically activating inorganic compound; substantially as described.

6. A catalyzer, comprising as one of its elements, charcoal impregnated with a catalytically activating inorganic compound; substantially as described.

7. A catalyzer, comprising as one of its elements, charcoal made catalytically active by impregnation with a silicate.

8. A catalyzer, comprising as one of its elements, charcoal made catalytically active by impregnation with a silicate of an earth metal.

9. A catalyzer, comprising as one of its elements, charcoal made catalytically active by impregnation with aluminum silicate.

10. A catalyzer, comprising as one of its elements, charcoal impregnated with a catalytically activating oxygen compound of aluminum.

In testimony whereof I affix my signature, in presence of two witnesses.

MARTIN HILL ITTNER.

Witnesses:
J. DOUGLAS, HEDGES,
W. MARIE MELIN.